Patented Sept. 2, 1941

2,254,872

UNITED STATES PATENT OFFICE

2,254,872

α - KETOACID DERIVATIVES OF 4,4′ - DIAMINODIPHENYL SULPHONE AND PROCESS OF MAKING THEM

Morris S. Kharasch and Otto Reinmuth, Chicago, Ill., assignors to Eli Lilly and Company, Indianapolis, Ind., a corporation of Indiana No Drawing. Application May 22, 1940, Serial No. 336,578

10 Claims. (Cl. 260—397.7)

Our invention relates to certain new α-keto acid derivatives of 4,4′-diaminodiphenyl sulphone, and to the process of making them.

These new products are found to be effective as anti-pneumococcal and anti-streptococcal agents.

Our new products may be either disubstituted or monosubstituted, and have the following general formula:

Disubstituted:

(1) 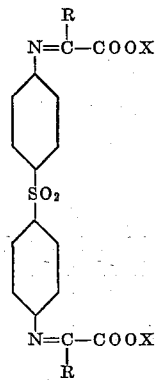

Monosubstituted:

(2) 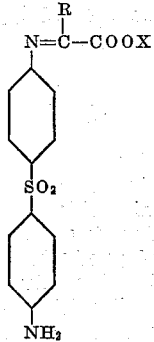

in which R represents hydrogen, or a primary or secondary alkyl, an alkenyl or an aralkyl hydrocarbon radical containing not to exceed 8 carbon atoms; and X represents a member of the class of positive ions consisting of hydrogen, the alkali metals, the alkaline-earth metals, ammonium, and the lower-alkyl ammoniums. Specifically, by way of example, R may be hydrogen, methyl, ethyl, propyl, allyl, crotyl, benzyl, or phenethyl.

These new products are prepared by the condensation of 4,4′-diaminodiphenyl sulphone with α-keto acids, (which acids are also sometimes called by other names, such as acylformic acids). Such condensation is obtained as follows:

An α-keto acid of the general formula:

(3) 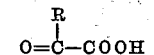

in which R has the same meaning as above set forth, is dissolved in a suitable solvent, such as dioxane or alcohol or ethyl acetate, and is treated with 4,4′-diaminodiphenyl sulphone. The mixture is heated; whereupon solution usually results. The formation of the solution, however, may or may not indicate completion of the reaction. To complete the reaction, the mixture must usually be heated for some time, depending upon the nature of the α-keto acid and the boiling point and the volume of the solvent used; as with some α-keto acids merely bringing the solution to a brisk boil is sufficient, while with others it is necessary to continue the heating for a considerable period, as from 10 to 60 minutes.

In any case, the end of the reaction is ascertained by removing a sample of the reaction mixture, diluting it with water, and adding sodium carbonate to it; whereupon if complete solution then results the reaction is complete.

To separate the reaction product, most of the solvent is removed, as by high vacuum evaporation, and the remaining concentrate is poured into a large quantity of ice water; whereupon a precipitate separates. This precipitate is collected on a filter; and is the desired product, mainly the disubstituted product but with smaller amounts of the monosubstituted product co-present, which have the following formulas:

(4)
(5)
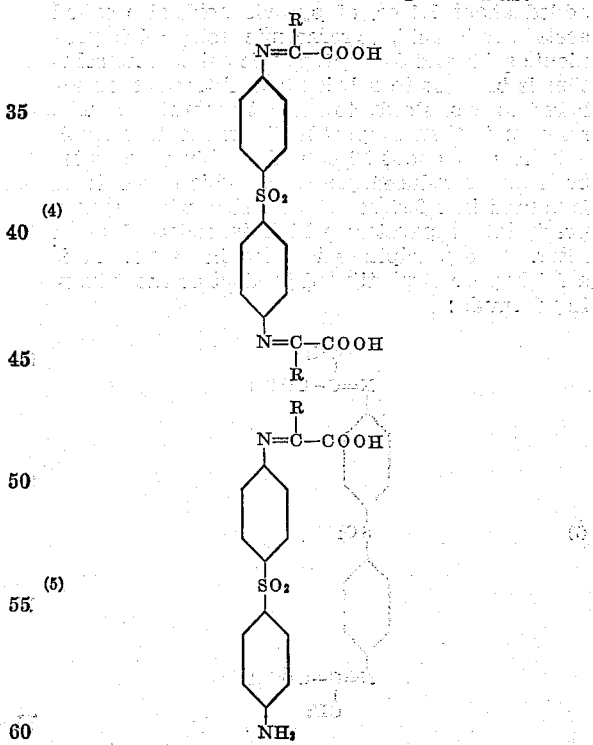

To obtain the sodium salt, the initial precipitate obtained when the concentrate is poured into ice water, desirably after being dried, is dissolved in alcohol of high concentration, desirably absolute alcohol for best yields, although 95% alcohol may be used. The whole is filtered, if necessary, and the filtrate is treated with an alcoholic solution of sodium hydroxide to cause precipitation of the sodium salt; which for the disubstituted product has the following formula:

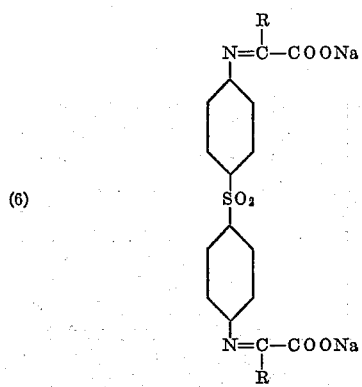

(6)

in which R has the same meaning as before. Other salts than the sodium salt may be prepared by similar methods; such for instance as the potassium salt, the calcium salt, the ammonium salt, or the mono-methyl-ammonium salt or the mono-ethyl-ammonium salt. If the salt is soluble in alcohol, it may be precipitated by adding a solvent in which such a salt is substantially insoluble, such for instance as ether or a mixture of ether and ligroin.

The following are some examples of our process:

*Example 1*

To 2.5 g. of 4,4'-diaminodiphenyl sulphone dissolved in about 25 cc. of hot dioxane there is added about 1.4 cc. of pyruvic acid, also called acetylformic acid, pyroracemic acid, α-ketopropionic acid, and 2-oxopropanoic acid. The solution is brought to a brisk boil, filtered, then allowed to cool slowly to room temperature. The solution is then evaporated in vacuo to a small volume (say about 10 cc.), desirably on a water bath under reduced pressure. This concentrate is poured into 200 cc. of ice water, whereupon a precipitate separates; which is collected on a filter. The precipitate is dried in vacuo. It is a fairly pure disubstituted product of the following formula:

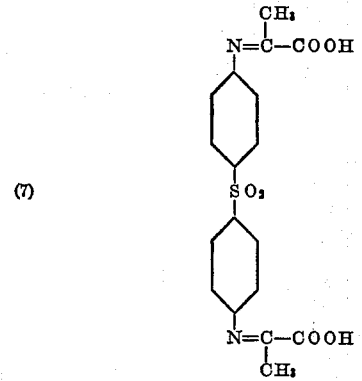

(7)

This precipitate may be designated as N,N'-di-(1-carboxyethylidene)-4,4'-diaminodiphenyl sulphone.

For therapeutic purposes, this disubstituted acidic compound is desirably converted into a salt, most conveniently the sodium salt. That may be done as follows:

The precipitate, which is the free acid of formula 7, is dissolved in absolute alcohol. The solution is filtered if necessary. Then an alcohol solution of sodium hydroxide is added until the reaction mixture is definitely alkaline to litmus. A precipitate separates, which is the desired sodium salt, of the following formula:

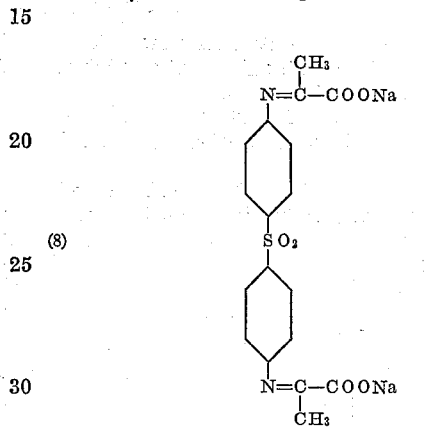

(8)

The purity of this salt is indicated by analysis for nitrogen; of which the calculated value is 6.48%, while the value found for one sample was 6.52%.

*Example 2*

In place of pyruvic acid, other α-keto acids may be used, of the general type shown in formula 3 above. Among such acids are the following:

Glyoxylic acid (i. e., formylformic acid);
Propionylformic acid (i. e., 2-oxobutanoic acid);
Butyrylformic acid;
2-Oxo-4-pentenoic acid;
Phenylacetylformic acid;
Phenylpropionylformic acid.

The disubstituted products produced by condensation of 4,4'-diaminodiphenyl sulphone with these acids produce the following products:

N,N' - di - (1 - carboxymethylidene) - 4,4' - diaminodiphenyl sulphone:

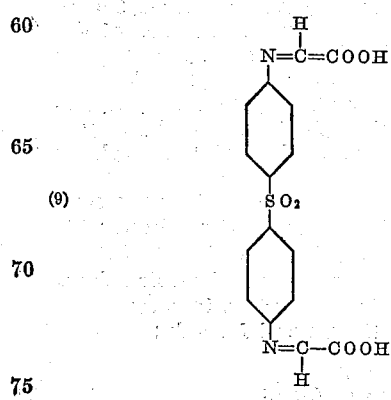

(9)

N,N'-di-(1-carboxypropylidene)-4,4'-diaminodiphenyl sulphone:

(10) 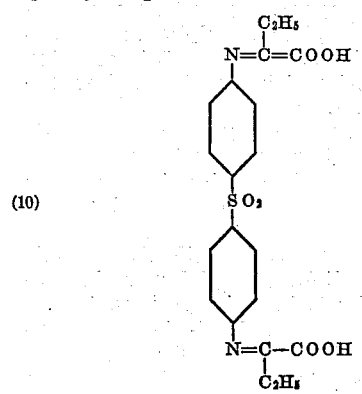

N,N'-di-(1-carboxybutylidene)-4,4'-diaminodiphenyl sulphone:

(11) 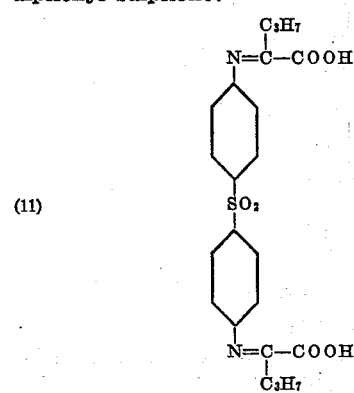

N,N'-di-(1-carboxy-3-butenylidene)-4,4'-diaminodiphenyl sulphone:

(12) 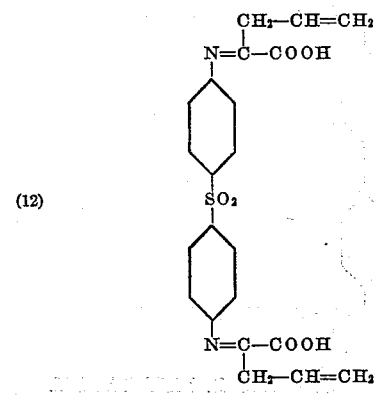

N,N'-di-(1-carboxy-2-phenylethylidene)-4,4'-diaminodiphenyl sulphone:

(13) 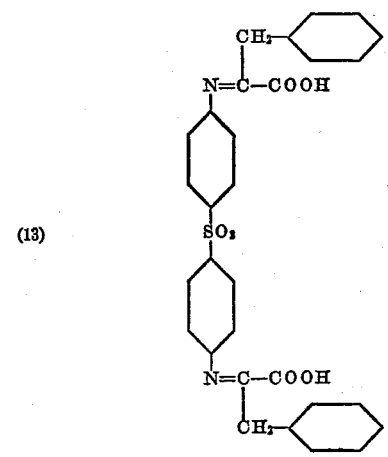

N,N'-di-(1-carboxy-3-phenylpropylidene)-4,4'-diaminodiphenyl sulphone:

(14) 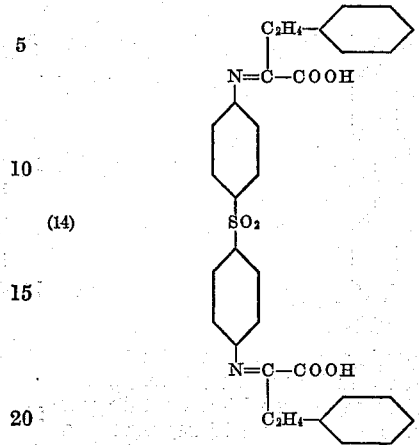

All these products, and to a lesser extent their monosubstituted analogues, and to a greater extent their sodium salts and their ammonium salts and their lower-alkyl-ammonium salts, are found to have valuable anti-pneumococcal and anti-streptococcal properties on both oral and parenteral administration.

We claim as our invention:

1. The new therapeutically effective substituted 4,4'-diaminodiphenyl sulphones, in which the two hydrogen atoms of at least one of the amino groups are replaced by the divalent radical

in which R represents a member of the class consisting of hydrogen and those alkyl, alkenyl, and aralkyl hydrocarbon radicals which contain not to exceed 8 carbon atoms; and X represents a member of the class of positive ions consisting of hydrogen, the alkali metals, the alkaline-earth metals, ammonium, and the lower-alkyl ammoniums.

2. The new therapeutically effective disubstituted 4,4'-diaminodiphenyl sulphones which are represented by the following formula:

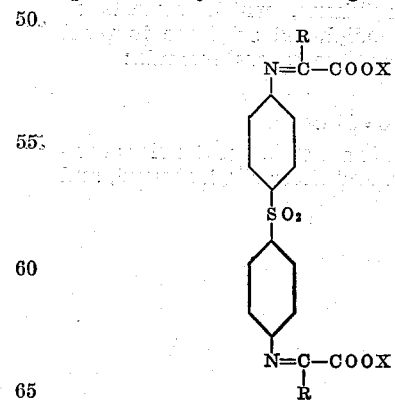

in which R represents a member of the class consisting of hydrogen and those alkyl, alkenyl, and aralkyl hydrocarbon radicals which contain not to exceed 8 carbon atoms; and X represents a member of the class of positive ions consisting of hydrogen, the alkali metals, the alkaline-earth metals, ammonium, and the lower-alkyl ammoniums.

3. The new therapeutically effective monosubstituted 4,4'-diaminodiphenyl sulphones which are represented by the following formula:

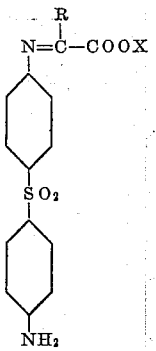

in which R represents a member of the class consisting of hydrogen and those alkyl, alkenyl, and aralkyl hydrocarbon radicals which contain not to exceed 8 carbon atoms, and X represents a member of the class of positive ions consisting of hydrogen; the alkali metals, the alkaline-earth metals, ammonium, and the lower-alkyl ammoniums.

4. The new therapeutically effective diphenyl sulphone derivative which is represented by the following formula:

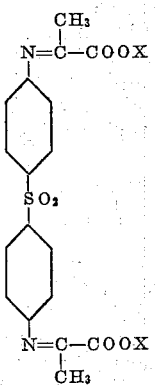

in which X represents a member of the class of positive ions consisting of hydrogen, the alkali metals, the alkaline-earth metals, ammonium, and the lower-alkyl ammoniums.

5. The process of producing a substituted 4,4'-diaminodiphenyl sulphone, which consists in causing 4,4'-diaminodiphenyl sulphone to react with an α-keto acid of the general formula:

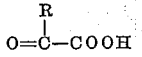

in which R represents a member of the class consisting of hydrogen and those alkyl, alkenyl, and aralkyl hydrocarbon radicals which contain not to exceed 8 carbon atoms.

6. The new therapeutically effective substituted 4,4'-diaminodiphenyl sulphones in accordance with claim 1, in which R is an alkyl hydrocarbon radical which contains not to exceed 8 carbon atoms.

7. The new therapeutically effective substistuted 4,4'-diaminodiphenyl sulphones in accordance with claim 1, in which R is an alkenyl radical which contains not to exceed 8 carbon atoms.

8. The new therapeutically effective substituted 4,4'-diaminodiphenyl sulphones in accordance with claim 1, in which X is sodium.

9. The sodium salt of N,N'-di-(1-carboxyethylidene) - 4,4' - diaminodiphenyl sulphone which is represented by the following formula:

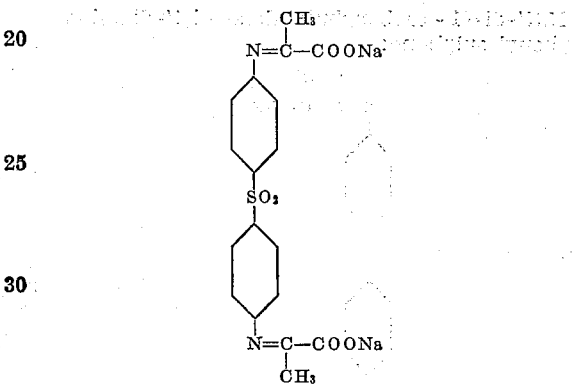

10. N,N'-di - (1-carboxy-3-butenylidene) -4,4'-diaminodiphenyl sulphone which is represented by the following formula:

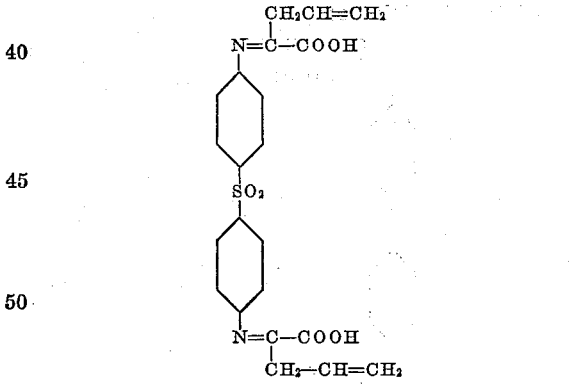

MORRIS S. KHARASCH.
OTTO REINMUTH.